United States Patent [19]

Yuzo

[11] Patent Number: 4,885,734
[45] Date of Patent: Dec. 5, 1989

[54] DIFFRACTION GRATING USING BIREFRINGENCE AND OPTICAL HEAD IN WHICH A LINEARLY POLARIZED BEAM IS DIRECTED TO A DIFFRACTION GRATING

[75] Inventor: Ono Yuzo, Tokyo, Japan

[73] Assignee: NEC Corporation, Tokyo, Japan

[21] Appl. No.: 75,456

[22] Filed: Jul. 20, 1987

[30] Foreign Application Priority Data

Jul. 18, 1986 [JP] Japan ................................ 61-170244
Dec. 12, 1986 [JP] Japan ................................ 61-294695
Jan. 16, 1987 [JP] Japan ................................ 62-7582

[51] Int. Cl.$^4$ .................... G11B 7/09; G11B 12/10; G01J 1/20

[52] U.S. Cl. ................ 369/45; 250/237 G; 350/162.2; 350/162.23; 369/46; 369/109; 369/112; 369/120

[58] Field of Search ............... 369/109, 111, 112, 120, 369/46, 45, 103; 250/237 G; 350/162.17, 400, 401, 162.2, 162.23

[56] References Cited

U.S. PATENT DOCUMENTS

| | | | |
|---|---|---|---|
| 3,876,842 | 4/1975 | Bouwhuis | 369/109 |
| 4,665,310 | 5/1987 | Heemskerk | 369/45 |
| 4,733,065 | 3/1988 | Hoshi et al. | 369/45 |
| 4,733,277 | 3/1988 | Kokado | 369/45 |
| 4,733,943 | 3/1988 | Suzwki et al. | 350/162.2 |
| 4,753,513 | 6/1988 | Shikama | 369/46 |
| 4,771,411 | 9/1988 | Greve | 369/46 |

*Primary Examiner*—Steven L. Stephan
*Attorney, Agent, or Firm*—Sughrue, Mion, Zinn, Macpeak & Seas

[57] ABSTRACT

A diffraction grating comprises a birefractive sheet (11) having a corrugated surface with at least each groove filled with a mass (12) of a material of a refractive index which is substantially equal to one of ordinary and extraordinary indices of the birefractive sheet. The diffraction grating is effective in an optical head device when made to have a plurality of grating regions of different patterns of corrugations. In this event, a linearly polarized beam should be supplied to the diffraction grating with electric vectors directed parallel to those of ordinary and extraordinary components when the refractive index is substantially equal to the ordinary and extraordinary indices, respectively. Alternatively, such an optical head device may comprise a reflection grating in which reflective corrugations are substantially parallel in the respective grating regions. In this event, a linearly polarized beam is supplied from an optical source to the reflective corrugations as a p-polarized beam. When either the birefringence grating or the reflection grating is used, the optical head device should further comprise a quarterwave plate for receiving the linearly polarized beam which is exited from the grating.

10 Claims, 2 Drawing Sheets

DIFFRACTION GRATING USING BIREFRINGENCE AND OPTICAL HEAD IN WHICH A LINEARLY POLARIZED BEAM IS DIRECTED TO A DIFFRACTION GRATING

BACKGROUND OF THE INVENTION

This invention relates to a diffraction grating and to an optical head device which comprises a diffraction grating and is for use in recording optical information on an optical recording medium and/or playing back the optical information from the optical recording medium in an optical disk device which is, for example, a compact disk (CD) device. The optical recording medium may be an optical disk, a digital audio disk, or a video disk. The optical head device is alternatively referred to, briefly, as an optical head.

In the manner described in an elder patent application filed by Yuzo ONO, the present applicant, et al (in the U.S., filed Dec. 10, 1986, as Pat. Application Serial No. 940,007 and in EPC, filed the 9th Dec. 1986 as Pat. Application No. 86 117 152.8), such an optical head device is used in combination with an optical source and an optical detector assembly in dealing with the optical recording medium and has a main optical axis. The optical source is ordinarily a semiconductor laser and is for producing a laser beam along the optical axis. Usually, the optical detector assembly is disposed adjacent to the optical source and is a photodiode which is partitioned into a plurality of individual optical detectors, such as four or six optical detectors.

Generally speaking, the optical head device comprises an optical system which, in turn, comprises a focussing lens and a beam splitter unit. Naturally, the focussing lens has a lens axis which may, or may not, be collinear with the main optical axis as will become clear below. In any event, the optical recording medium is held perpendicular to the lens axis. Responsive to an input or incident beam received along the lens axis, the focussing lens produces a converging beam which is focussed on the optical recording medium. When used in reproducing the optical information, the optical head device makes use of a diverging beam which is reflected from the optical recording medium as a reflected beam along the lens axis. Responsive to the reflected beam, the focussing lens produces an output, or exit, beam along the lens axis. The beam splitter unit causes the coherent beam to pass therethrough as the input beam and directs the output beam to the optical detector assembly as a plurality of sidewards directed beams along side optical axes which customarily are not coincident with the main optical axis. There may be two sidewards directed beams, in which case there would be two side optical axes are.

In the optical head device disclosed in the elder patent application, the beam splitter unit is uniquely implemented by a diffraction grating which has a plurality of grating regions. Responsive to the laser beam, the grating regions cooperatively produce a zero-order diffracted beam as the input beam. Responsive to the output beam, the grating regions individually produce sidewards diffracted beams as the respective sidewards directed beams. Each sidewards diffracted beam is preferably a first-order diffracted beam.

Regarding the optical head device revealed in the elder patent application it should be noted that the coherent beam passes through the diffraction grating as the zero-order diffracted beam on its way to the focussing lens and, preferably, as the first-order diffracted beam returning from the focussing lens. The diffraction grating therefore has a poor laser-beam utilization efficiency which can be defined as a product of a diffraction efficiency of the diffraction grating for the zero-order diffracted beam and another diffraction efficiency for the first-order diffracted beam. The laser-beam utilization efficiency is at most 10% when the diffraction grating is a ridge and groove grating.

Furthermore, it should be noted that the diffraction grating described above is not much different from a single diffraction grating which is used in various optical devices, such as a spectrometer. Additionally, the laser beam is not necessarily a linearly or plane polarized beam.

SUMMARY OF THE INVENTION

It is an object of the present invention to provide a novel diffraction grating which comprises birefractive or birefringent sheet.

It is another object of this invention to provide a novel diffraction grating of the type described, which serves well as an optical beam splitter unit.

It is still another object of this invention to provide a novel diffraction grating of the type described, which serves as an excellent component of an optical head device.

It is a further object of this invention to provide an optical head device in which a linearly polarized beam is directed to a diffraction grating as a laser beam.

It is a still further object of this invention to provide an optical head device of the type described, which utilizes the coherent beam in a highly efficient manner.

It is a specific object of this invention to provide an optical head device of the type described, in which the diffraction grating is the novel diffraction grating described above.

It is another specific object of this invention to provide an optical head device of the type described, wherein use is made of the known fact that the diffraction grating has a diffraction efficiency dependent on the direction of polarization of the linearly polarized beam relative to ridges and grooves of the diffraction grating.

According to an aspect of this invention, there is provided a diffraction grating comprising a birefractive sheet having a corrugated surface to provide a grating, wherein at least each groove of the corrugated surface is filled with a mass of a material having a refractive index which is substantially equal to one of ordinary and extraordinary indices of the birefractive sheet Another aspect of this invention is applicable to an optical head device which is for use in combination with an optical source for generating a laser beam along a main optical axis and with an optical recording medium and which includes a focussing lens for focussing an input beam on the optical recording medium along a lens axis of the focussing lens and responsive to an optical beam reflected from the optical recording medium for producing an output beam along the lens axis, and a diffraction grating having a plurality of grating regions responsive to the laser beam for producing a zero-order diffracted beam as the input beam and responsive to the output beam for directing a plurality of sidewards diffracted beams to an optical detector assembly along a plurality of side optical axes. According to this aspect of this invention, the optical head device comprises a quarter-wave plate through which the input and the output beams pass along the lens axis, the coherent beam being a linearly polarized beam.

DETAILED DESCRIPTION OF THE PREFERRED EMBODIMENTS

Figure 1:
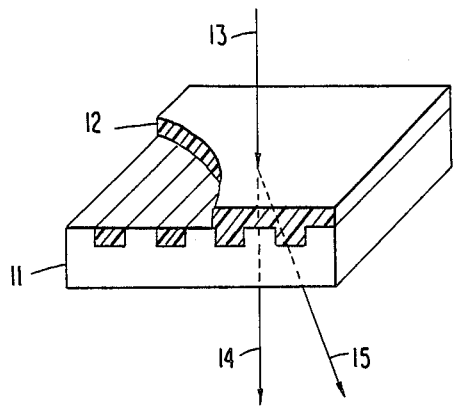
FIG. 1. schematically shows a partially cut away perspective view of a diffraction grating according to an embodiment of the instant invention.

Referring to FIG. 1, a novel diffraction grating comprises a birefractive or birefringent sheet 11 having a corrugated surface which provides a ridge and groove grating. At least each groove of the corrugated surface is filled with a mass 12 of a material having a refractive index which is substantially equal to one of ordinary and extraordinary indices of the birefractive sheet 11. Inasmuch as the ordinary and the extraordinary indices are mentioned, the birefractive sheet 11 is of a uniaxial material, such as a uniaxial crystal.

In a diffraction grating according to a preferred embodiment of the present invention, a calcite (Iceland spar) plate was used as the birefractive sheet 11. It is well known that rays are propagated in the birefractive sheet of a uniaxial material as an ordinary and an extraordinary component, and that calcite has an ordinary index $n_o$ of 1.6544 and an extraordinary index $n_e$ of 1.485 for rays which are emitted by a known semiconductor laser. The ridge and groove grating was formed by ion etching a surface of the calcite plate 11 through a mask which was preliminarily formed on the surface as a photoresist pattern by photolithography known in the art.

The grooves of the ridge and groove grating were filled with a continuous mass 12 of acrylic resin having a refractive index of 1.490. More particularly, the corrugated surface was covered with the acrylic resin by resorting to spin coating known in the art. The mass 12 was made to have an even exposed surface parallel to a surface which the calcite plate 11 had opposite to the corrugated surface. It is to be noted in connection with the diffraction grating being illustrated that the refractive index of the mass 12 is substantially equal to the extraordinary index of the calcite plate 11.

An optical beam was caused to be incident on the exposed surface of the mass 12 as an input or incident beam 13. Inasmuch as the refractive index of the mass 12 and the extraordinary index of the calcite plate 11 had a difference of only 0.005, the diffraction grating served for the extraordinary component of the input beam 13 substantially as a single sheet of a uniaxially birefractive material to maximize the extraordinary component passing through the diffraction grating as an output or exit beam 14 which was parallel to the input beam 13 and, therefore, may be called a zero-order diffracted beam. For the ordinary component of the input beam 13, the diffraction grating served as a phase grating to produce a first-order diffracted beam 15 as well as the zero-order diffracted beam 14.

In FIG. 1, the mass 12 may fill only each groove of the ridge and groove grating so that the diffraction grating may have an exposed surface of such masses which is coplanar with ridge tops of the ridge and groove grating. Furthermore, the material of the mass or masses 12 may have a refractive index which is substantially equal to the ordinary index of the birefractive sheet 11. Selection of such a material is readily possible for one skilled in the art. Moreover, it should be noted that the input beam 13 is perpendicular in FIG. 1 to the exposed surface of the diffraction grating. Irrespective of such an angle of incidence, the diffraction grating serves equally well even when the input beam 13 is incident on the opposite surface.

According to the description made thus far of the novel diffraction grating, the diffraction grating does not have a 100% diffraction efficiency. In other words, the phase grating produces the first-order diffracted beam 15 along with the zero-order diffracted beam 14 of an appreciable intensity or amount of energy However, it is possible to raise the diffraction efficiency by using the diffraction grating as a Bragg grating, commonly known in the art. More specifically, the diffraction grating is made to have deep grooves and is used in the Bragg mount.

It will now be appreciated that the novel diffraction grating is capable of splitting the input beam 13 into first and second output beams 14 and 15. One of the first and the second output beams 14 and 15 is a beam that results from the ordinary component in the birefractive sheet 11. The other output beam results from the extraordinary component in the birefractive sheet 11. Therefore, the novel diffraction grating is therefore operable as a beam splitter unit. The novel diffraction grating serves as an excellent component in an optical head device, inasmuch as the beam splitter unit is thin or compact, light-weight, and readily manufactured without the troublesome processes of grinding optical glass pieces into prisms and lenses, evaporating dielectric multilayer films on the prisms, and uniting such prisms together in the manner referred to in the elder patent application cited hereinabove. The optical head device can be used in an optical disk device, a digital audio disk (compact disk) device, or a video disk device.

Figure 2:
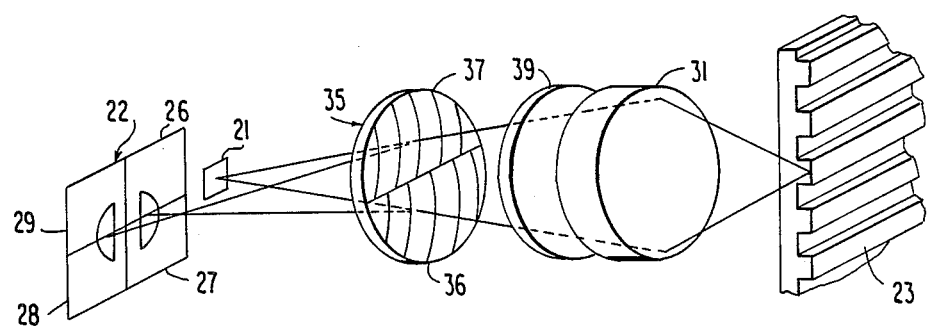
FIG. 2 schematically shows a perspective view of an optical head device according to a first embodiment of this invention, together with an optical source, an optical detector assembly, and an optical recording medium.

Referring now to FIG. 2, an optical head device according to a first embodiment of the present invention will be described. The optical head device is for use in combination with an optical source 21 and an optical detector assembly 22 placed adjacent to the optical source 21 and is for recording optical information on an optical recording medium 23 and/or reproducing the optical information from the optical recording medium 23. In the manner described below the optical head device has a main optical axis and a reference line which is orthogonal to the main optical axis and defines a reference plane in cooperation with the main optical axis.

The optical source 21, which usually is a semiconductor laser or laser diode, generates a laser beam along the main optical axis. The optical recording medium 23 may be an optical disk, a digital audio disk, or a video disk, and has a recording or disk surface on which a plurality of tracks are defined for optical information and which is disposed relative to the optical head device as described below. For example, in FIG. 2 the optical source 21 and the optical detector assembly 22 are located at positions equidistant from the center of the diffraction grating 35. The optical detector assembly 22 is a four-partitioned optical detector assembly which is known in the art below.

In the manner described in the elder patent application cited above, the optical detector assembly 22 is a photodiode having a light-receiving surface which is divided by at least two orthogonal or parallel partition lines into a plurality of individual optical detectors. For example, in FIG. 2, one of two orthogonal partition lines passes through the optical source 21 and is parallel to the reference line. The partition line under consideration will be called a main partition line. The other partition line will be named an auxiliary partition line. An intersection of the main and the auxiliary partition lines will be termed an assembly center. The individual optical detectors will be referred to as first through fourth optical detectors 26, 27, 28, and 29, respectively. The first and the second optical detectors 26 and 27 are partitioned by a first part of the main partition line and are on one side of the auxiliary partition line that is nearer to the optical source 21. The third and the fourth optical detectors 28 and 29 are partitioned by a second part of the main partition line and are contiguous on the other side of the auxiliary partition line to the second and the first optical detectors 27 and 26, respectively.

The optical head device comprises an optical system comprising, in turn, a focussing lens 31 which may not be a single lens as depicted, but may be a lens system. At any rate, the focussing lens 31 has a lens axis, is perpendicular to the reference plane, and is accompanied by a lens actuator which is described in the elder patent application and is not depicted in FIG. 2. The optical recording medium 23 is held so as to have the recording surface perpendicular to the lens axis. In the illustrated example, the lens axis and the main optical axis are collinear. The tracks have tangents parallel to the reference line. In the manner described below, the focussing lens 31 receives an input or incident beam along the lens axis to produce a converging beam which is focussed on the recording surface as a light spot of a diameter of about 1 micron. When used in playing back the optical information from the optical recording medium 23, the optical head device makes use of a diverging beam which is reflected from the recording surface as a reflected beam along the lens axis. Responsive to the reflected beam, the focussing lens 31 produces an output or exit beam along the lens axis.

A diffraction grating 35 is used as a beam splitter unit of the optical system and is arranged perpendicular to the lens so as to have a grating center on the lens axis. In general, the diffraction grating 35 is divided by at least one partition line into a plurality of grating regions. Different grating patterns of corrugations are given to the respective grating regions. Supplied with the laser beam along the main optical axis, the grating regions cooperatively produce a zero-order diffracted beam as the input beam of the focussing lens 31. Responsive to the output beam of the focussing lens 31, the grating regions individually produce sidewards diffracted beams to the optical detector assembly 22 along side optical axes, respectively. Each sidewards diffracted beam is preferably a first-order diffracted beam.

It will be assumed merely by way of example that the different patterns are formed in the manner which is described in the elder patent application and, in particular, with FIGS. 19 and 20 thereof. More specifically, the diffraction grating 35 has a single partition line which passes through the grating center parallel to the reference line. The grating regions are, therefore, first and second grating regions 36 and 37 which are depicted below and above the single partition line merely for convenience of the description that follows. For the grating pattern of the first grating region 36, a first point of the optical detector assembly 22 is selected on the first part of the main partition line of the optical detector assembly 22. Likewise, a second point is selected on the second part of the main partition line. The first and the second points are equidistant from the assembly center.

The pattern of the first grating region 36 has interference fringes between a spherical wave front diverged from the optical source 21 and a divergent wave which is an astigmatic wave front having a minimum confusion circle on the first point of the optical detector assembly 22. The pattern of the second grating region 37 has interference fringes between the spherical wave front diverged from the optical source 21 and a divergent, astigmatic wave front which has a minimum confusion circle on the second point of the optical detector assembly 22.

Such a diffraction grating is preferably manufactured like a replica by using a master photoresist pattern for which the interference fringes are drawn by an electronic digital computer. The diffraction grating 35 may have an effective area with approximately a 5 mm diameter and a grating constant of 2 to 4 microns.

As one of the sidewards diffracted beams, the first grating region 36 produces a first diffracted beam which forms an image of the first grating region 36 on the first part of the main partition line of the optical detector assembly 22. The second grating region 37 produces a second diffracted beam and forms an image of the second grating region 37 on the second part of the main partition line. Responsive to the images, the first through the fourth optical detectors 26 to 29 produce first through fourth electric outputs, respectively.

The optical information is reproduced as an electric signal by a total sum of the first through the fourth electric outputs. A focussing error of the converging beam on the recording surface of the optical recording medium 23 is detected by a difference between a first sum of the first and the third electric outputs and a second sum of the second and the fourth electric outputs. A tracking error of the light spot relative to each track of the optical recording medium 23 is detected by another difference between a third sum of the first and the second electric outputs and a fourth sum of the third and the fourth electric outputs.

In FIG. 2, the diffraction grating 35 is of the type illustrated with reference to FIG. 1 hereinabove. However, it should be noted that the diffraction grating 35 is divided into a plurality of grating regions in the manner described above. To wit, the grating regions should comprise a birefractive or birefringent sheet 11 (FIG. 1) in common. The corrugated surface should have different grating patterns of corrugations or ridges and grooves in the respective grating regions.

In addition, a linearly or plane polarized beam should be used as the laser beam. It will be presumed merely for clarity of description that a mass 12 (FIG. 1) in each groove of the diffraction grating 35 has a refractive index which is substantially equal to the extraordinary index of the birefractive sheet. Accordingly, electric vectors of the linearly polarized beam should be perpendicular to electric vectors of the ordinary component in the birefractive sheet and parallel to electric vectors of the extraordinary component. Such a linearly polarized beam is produced from the optical source 21 readily by one skilled in the art. It is convenient to direct, parallel to the electric vectors of the ordinary or the extraordinary component, either the single grating line or one of the grating lines that passes through the grating center. At any rate, a quarterwave plate 39 is interposed between the diffraction grating 35 and the focussing lens 31 perpendicular to the lens axis and with its optical axis directed to form an angle of 45° with a plane of polarization of the ordinary or the extraordinary component in the birefractive sheet.

Substantially 100% of the extraordinary component passes through the grating regions of the diffraction grating 35 as the above-mentioned zero-order diffracted beam 14 (FIG. 1) which has electric vectors parallel to the above-described grating line. The zero-order diffracted beam passes through the quarter-wave plate 39 to appear as the input beam of the focussing lens 31. The input beam and, consequently, the converging beam are now a circularly polarized beam having a plane of polarization subjected to rotation in a first direction which depends on the nature of the quarter-wave plate 39.

It is well known that the reflected or the diverging beam is given a reversed phase relative to the converging beam by reflection at the recording surface of the optical recording medium 23. Therefore, the reflected beam and, consequently, the output beam of the focussing lens 31 are another circularly polarized beam having a plane of polarization subjected to rotation in a second direction which is reversed relative to the first direction. Passing through the quarter-wave plate 39, the output beam appears as another linearly polarized beam whose electric vectors are orthogonal to those of the zero-order diffracted beam. The output beam is therefore propagated through the diffraction grating 35 as the ordinary component. In this manner, the grating regions of the diffraction grating 35 individually produce the first-order diffracted beams, such as 15 (FIG. 1), as the respective sidewards diffracted beams. In the manner described above, it is possible to make each grating region have a high diffraction efficiency, and, hence, to raise the laser-beam utilization efficiency of the optical head device.

Reviewing FIG. 2, it will be understood readily that the mass in each groove of the diffraction grating 35 may have a refractive index which is substantially equal to the ordinary index of the birefractive sheet. In this event, the linearly polarized beam should have electric vectors parallel to electric vectors of the ordinary component in the birefractive sheet and perpendicular to electric vectors of the extraordinary component. Moreover, the diffraction grating 35 may not necessarily be a transparent grating but a reflection grating provided that the linearly polarized beam enters the diffraction grating 35, is reflected, and is again propagated through the diffraction grating 35 on its way towards, and returning from, the optical recording medium 23. The diffraction grating 35 may therefore be used in various manners which are described in the elder patent application with the optical detector assembly 22 also arranged in various configuration.

Figure 3:
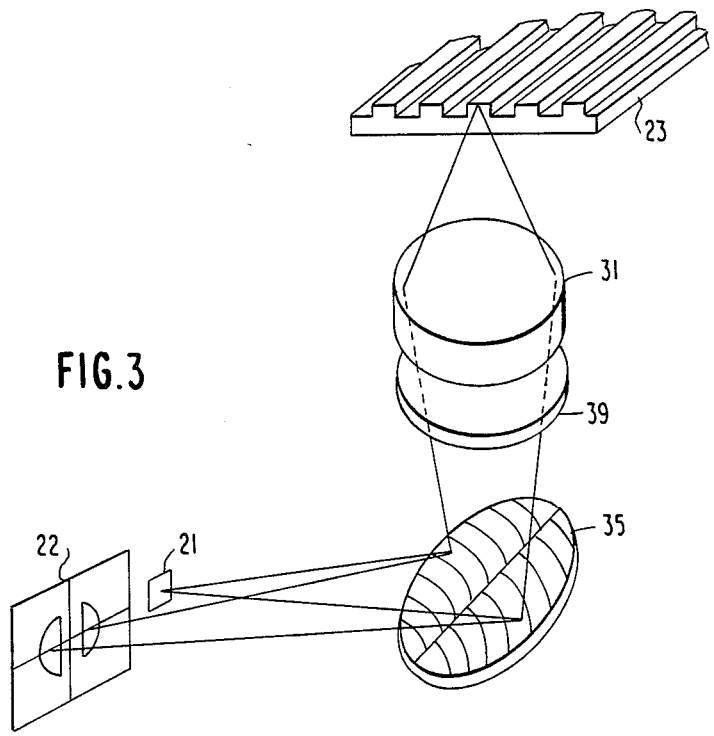
FIG. 3 similarly shows a perspective view of an optical head device according to a second embodiment of this invention.

Referring to FIG. 3, the description will now proceed to an optical head device according to a second embodiment of the present invention. The optical head device comprises similar parts which are designated by like reference numerals. It should, however, be noted that the diffraction grating 35 is not of the type illustrated with reference to FIG. 1 but should be a reflection grating having a corrugated surface which has substantially parallel grating corrugations or ridges and grooves in the respective grating regions and on which aluminium or a like reflective material is attached as by evaporation to provide a corrugated reflective surface. Furthermore, the quarterwave plate 39 should have its optical axis in a direction which forms an angle of 45° with the substantially parallel corrugations.

It is known that such a reflection grating has a diffraction efficiency that largely depends on polarization of the beam incident thereon. This fact is described, for example, in an article which was contributed by E.G. Loewen et al to Applied Optics, Volume 16, No. 10 (Oct. 1977), pages 2711 to 2721, under the title of "Grating Efficiency Theory as it Applies to Blazed and Holographic Gratings". From a number of figures shown in the Loewen et al article, it is understood that a reflection grating has, in many cases, a high efficiency for an s-polarized beam having electric vectors perpendicular to grating groove direction and a low efficiency for a p-polarized beam which has electric vectors parallel to the grating groove direction. Under specific conditions, the diffraction efficiency is nearly 100% for the s-polarized beam and is below 20% for the p-polarized beam.

In FIG. 3, a linearly polarized beam is again used as the laser beam. The linearly polarized beam should, however, become the p-polarized beam on reaching the reflective surface of the reflection grating 35. Inasmuch as only a small part is subjected to diffraction, about 80% of the p-polarized beam is reflected as the zero-order diffracted beam to reach the quarter-wave plate 39. In the manner described with reference to FIG. 2 above, the converging beam becomes a circularly polarized beam which has a plane of polarization subjected to rotation in a first direction.

Also in FIG. 3, the output beam of the focussing lens 31 becomes another circularly polarized beam having a plane of polarization subjected to rotation in a second direction opposite the first direction. The quarter-wave plate 39 supplies the reflective surface of the reflection grating 35 with a linearly polarized beam which is the s-polarized beam. Therefore, the reflection grating 35 therefore directs nearly 100% of the s-polarized beam to the optical detector assembly 22 as the first-order diffracted beam. Hence, the optical head device has a high laser-beam utilization efficiency.

Reviewing FIG. 3, the reflection grating 35 may comprise an optically isotropic transparent sheet having an even front surface and a corrugated reflective back surface of the type described above. The linearly polarized beam should be incident on the corrugated reflective back surface on its way towards the optical recording medium 23 and also on its return from the optical recording medium 23. The reflection grating 35 may have the substantially parallel corrugations in the respective grating regions in the manner described in the elder patent application with reference to FIGS. 4, 10, 12, 14 to 16, 19, 21, 25, 27, 29, 30, 32, and 33 thereof.

It should be noted, in conjunction with FIG. 2, that the first point of the optical detector assembly 22 is depicted as a point of intersection of the main partition line of the optical detector assembly 22 and the diameter which the image of the first grating region 36 has on the light-receiving surface of the optical detector assembly 22 when the focussing error is zero. Similarly, the second point of the optical detector assembly 22 is depicted as a point of intersection of the main partition line and the diameter which the image of the second grating region 37 has when the focussing error is zero.

In each of FIGS. 2 and 3, a combination of the diffraction grating 35 and the quarter-wave plate 39 serves as a grating unit having a direction dependency for a linearly polarized beam on a plane which is perpendicular to the lens axis. Throughout FIGS. 1 through 3, the diffraction grating is an optically anisotropic grating, although the diffraction grating of FIG. 1 need not be supplied with a linearly polarized beam. It is possible in FIG. 1 to cover the even exposed surface with a transparent sheet, while still leaving the surface "exposed " in the context of the invention.

What is claimed is:

1. A diffraction grating comprising a birefractive sheet having a corrugated surface to provide a grating, wherein at least each groove of said corrugated surface is filled with a mass of a material having a refractive index which is substantially equal to one of ordinary and extraordinary indices of said birefractive sheet.

2. A diffraction grating as claimed in claim 1, said birefractive sheet having an opposite surface opposite to said corrugated surface, wherein said mass fills each groove and has an even exposed surface which is coplanar with ridge tops of said corrugated surface and is parallel to said opposite surface.

3. A diffraction grating as claimed in claim 1, said birefractive sheet having an opposite surface opposite to said corrugated surface, wherein said mass covers said corrugated surface as a continuous mass and has an even exposed surface parallel to said opposite surface.

4. An optical head device for use in combination with an optical source for generating a laser beam along the main optical axis and with an optical recording medium, said optical head device including a focussing lens for focussing an input beam on said optical recording medium along a lens axis of said focussing lens and responsive to an optical beam reflected from said optical recording medium for producing an output beam along said lens axis, and a diffraction grating having a plurality of grating regions responsive to said laser beam for producing a zero-order diffracted beam as said input beam and responsive to said output beam for directing a plurality of sidewards diffracted beams to an optical detector assembly along a plurality of side optical axes, wherein the improvement comprises a quarter-wave plate through which said input and said output beams pass along said lens axes, said laser beam being a linearly polarized beam, and wherein said grating regions comprise a common birefractive sheet having a corrugated surface to provide a grating, at least each groove of said corrugated surface being filled with a mass of a material having a refractive index which is substantially equal to one of ordinary and extraordinary indices of said birefractive sheet, said corrugated surface having different patterns of corrugations in the respective grating regions.

5. An optical head device as claimed in claim 4, wherein said quarter-wave plate has an optical axis in a direction which forms an angle of 45° with directions of electric vectors of ordinary and extraordinary components which result from said linearly polarized beam in said birefractive sheet.

6. An optical head device as claimed in claim 5, said refractive index being substantially equal to said ordinary index, wherein said linearly polarized beam has electric vectors parallel to the electric vectors of said ordinary component.

7. 1 An optical head device as claimed in claim 5, said refractive index being substantially equal to said extraordinary index, wherein said linearly polarized beam has electric vectors parallel to the electric vectors of said extraordinary component.

8. An optical head device for use in combination with an optical source for generating a laser beam along a main optical axis and with an optical recording medium, said optical head device including a focussing lens for focussing an input beam on said optical recording medium along a lens axis of said focussing lens and responsive to an optical beam reflected from said optical recording medium for producing an output beam along said lens axis, and a diffraction grating having a plurality of grating regions responsive to said laser beam for producing a zero-order diffracted beam as said input beam and responsive to said output beam for directing a plurality of sidewards diffracted beams to an optical detector assembly along a plurality of side optical axes, wherein the improvement comprises a quarter-wave plate through which said input and said output beams pass along said lens axes, said laser beam being a linearly polarized beam, wherein said diffraction grating is a reflection grating having a corrugated reflective metallic surface which has different patterns of substantially parallel corrugations in the respective grating regions, said reflection grating having a diffraction efficiency that depends substantially on polarization of the beam incident thereon.

9. An optical head device as claimed in claim 8, wherein said linearly polarized beam has electric vectors substantially parallel to said substantially parallel corrugations.

10. An optical head device as claimed in claim 9, wherein said quarter-wave plate has an optical axis in a direction which forms an angle of 45° with said substantially parallel corrugations.

* * * * *

UNITED STATES PATENT AND TRADEMARK OFFICE
CERTIFICATE OF CORRECTION

PATENT NO. : 4,885,734

DATED : December 5, 1989

INVENTOR(S) : Yuzo Ono

It is certified that error appears in the above-identified patent and that said Letters Patent is hereby corrected as shown below:

Title page, below "United States Patent" delete "Yuzo" and insert --Ono--.

Title page, at [75], delete "Ono Yuzo" and insert --Yuzo Ono--.

Column 10, line 16, delete "1".

Signed and Sealed this

Nineteenth Day of February, 1991

Attest:

HARRY F. MANBECK, JR.

*Attesting Officer*  *Commissioner of Patents and Trademarks*